United States Patent
Li et al.

(10) Patent No.: US 12,259,361 B2
(45) Date of Patent: Mar. 25, 2025

(54) SYSTEM AND METHOD FOR PHOTOACOUSTIC INSPECTION OF AN OBJECT

(71) Applicants: IMEC VZW, Leuven (BE); Universiteit Gent, Ghent (BE)

(72) Inventors: YanLu Li, Kessel-lo (BE); Roeland Baets, Deinze (BE)

(73) Assignees: IMEC VZW, Leuven (BE); Universiteit Gent, Ghent (BE)

( * ) Notice: Subject to any disclaimer, the term of this patent is extended or adjusted under 35 U.S.C. 154(b) by 244 days.

(21) Appl. No.: 17/800,322

(22) PCT Filed: Feb. 15, 2021

(86) PCT No.: PCT/EP2021/053608
§ 371 (c)(1),
(2) Date: Aug. 17, 2022

(87) PCT Pub. No.: WO2021/165189
PCT Pub. Date: Aug. 26, 2021

(65) Prior Publication Data
US 2023/0067864 A1 Mar. 2, 2023

(30) Foreign Application Priority Data

Feb. 21, 2020 (EP) ..................... 20158675

(51) Int. Cl.
*G01N 29/24* (2006.01)
*G01N 29/46* (2006.01)
(52) U.S. Cl.
CPC ......... *G01N 29/2418* (2013.01); *G01N 29/46* (2013.01)
(58) Field of Classification Search
CPC ............... G01N 29/2418; G01N 29/46; G01N 2021/1706; G01N 21/1702
See application file for complete search history.

(56) References Cited

U.S. PATENT DOCUMENTS

| 4,144,767 A | 3/1979 | Kaule et al. |
| 4,379,409 A | 4/1983 | Primbsch et al. |

(Continued)

FOREIGN PATENT DOCUMENTS

| CN | 106483074 A | 3/2017 |
| WO | 0238040 A2 | 5/2002 |

(Continued)

OTHER PUBLICATIONS

PCT International Search Report and Written Opinion, Application No. PCT/EP2021/053608, mailed May 7, 2021, 15 pages.

(Continued)

*Primary Examiner* — Suman K Nath
(74) *Attorney, Agent, or Firm* — McDonnell Boehnen Hulbert & Berghoff LLP

(57) ABSTRACT

The disclosure includes a system for photoacoustic inspection of an object. The system includes a broadband emission source configured to generate an emission beam, a direction apparatus including at least one spectrum splitter configured to split the emission beam into at least a first and a second component, the direction apparatus being configured to sequentially direct the respective components to N respective locations on the object at N times to generate N respective acoustic waves within the object. The N respective locations and N times are such that the respective N acoustic waves at least semi-constructively interfere to generate a respective propagating acoustic wave within the object. The system also includes a vibration sensing system configured to detect said respective propagating acoustic waves at a respective detection location on the object.

20 Claims, 9 Drawing Sheets

(56) References Cited

U.S. PATENT DOCUMENTS

| | | | |
|---|---|---|---|
| 2004/0145737 A1 | 7/2004 | Hocker | |
| 2010/0033720 A1 | 2/2010 | Van Neste et al. | |
| 2014/0243666 A1* | 8/2014 | Moilanen | A61B 5/0097 600/437 |
| 2019/0339162 A1* | 11/2019 | Munk | G01N 29/036 |

FOREIGN PATENT DOCUMENTS

| | | |
|---|---|---|
| WO | 2012057760 A1 | 5/2012 |
| WO | 2013064740 A1 | 5/2013 |

OTHER PUBLICATIONS

Pei, Cuixiang, Kazuyuki Demachi, Tetsuo Fukuchi, Kazuyoshi Koyama, and Mitsuru Uesaka. "Cracks measurement using fiber-phased array laser ultrasound generation." Journal of Applied Physics 113, No. 16 (2013): 163101.

Huang, Jin, Sridhar Krishnaswamy, and Jan D. Achenbach. "Laser generation of narrow-band surface waves." The Journal of the Acoustical Society of America 92, No. 5 (1992): 2527-2531.

Li, Yanlu, Jinghao Zhu, Matthieu Duperron, Peter O'Brien, Ralf Schüler, Soren Aasmul, Mirko De Melis, Mathias Kersemans, and Roel Baets. "Six-beam homodyne laser Doppler vibrometry based on silicon photonics technology." Optics Express 26, No. 3 (2018): 3638-3645.

Noroy, Marie-Hélène, Daniel Royer, and Mathias Fink. "The laser-generated ultrasonic phased array: Analysis and experiments." The Journal of the Acoustical Society of America 94, No. 4 (1993): 1934-1943.

Fink, Mathias, and Mickael Tanter. "A multiwave imaging approach for elastography." Current Medical Imaging 7, No. 4 (2011): 340-349.

Bai, Wenyu, and Gerald J. Diebold. "Photoacoustic effect generated by moving optical sources: Motion in one dimension." Journal of Applied Physics 119, No. 12 (2016): 124904.

Wang, Yu, Konstantin I. Maslov, and Lihong V. Wang. "Spectrally encoded photoacoustic microscopy using a digital mirror device." Journal of Biomedical Optics 17, No. 6 (2012): 066020.

* cited by examiner

SYSTEM AND METHOD FOR PHOTOACOUSTIC INSPECTION OF AN OBJECT

CROSS REFERENCE TO RELATED APPLICATIONS

This application is a U.S. national phase application of international application no. PCT/EP2021/053608 filed on Feb. 15, 2021, which claims priority to European patent application no. 20158675.7 filed on Feb. 21, 2020, the contents of both being incorporated by reference in their entirety.

FIELD OF THE DISCLOSURE

The present invention relates to a system and a method for photoacoustic inspection, such as photoacoustic application or photoacoustic spectroscopy, of an object. The present invention also relates to a use of the system for photoacoustic inspection of an object.

BACKGROUND

Sound, which propagates as a pressure wave, can be induced in virtually any material, including biologic tissue, whenever time-varying electromagnetic energy is absorbed. When the stimulating radiation that induces these thermally generated acoustic waves is optical, the term "photoacoustic" applies to this effect.

Photoacoustic application is a known technique to inspect an object. Specifically, a photo-induced acoustic wave is used to detect the optical absorption coefficient at different locations of the object or the propagation property of the object. Consequently, photoacoustic application can be used to monitor various properties (e.g., sound speed dispersion) of the object. Moreover, by using the scattering of the generated acoustic wave, the internal structure of the object can be reconstructed using various photoacoustic (PA) imaging techniques.

Photoacoustic spectroscopy is another important field for material analysis. It uses the absorption spectrum of light within a material, i.e. within an object, to determine the concentration or distribution of a certain material. This can be done by directly measuring the generated acoustic waves based on the photoacoustic effect. Photoacoustic spectroscopy is advantageous compared to normal spectroscopy in situations in which light signals can be strongly scattered within the object since acoustic signals are not easily scattered due to their long wavelength such that the acoustic signal can be more easily measured compared to the transmission light signal in normal spectroscopy.

WO 2012/057760 A1, US 2004/0145737 A1, and US 2010/0033720 A1 disclose systems to perform photoacoustic spectroscopy. These systems use a light source with a diffraction grating to direct an optical light beam towards the object. A detector is used to detect a sound wave generated within the object.

A downside of the known systems is the efficiency of the PA effect. Specifically, the PA effect is not efficient enough to generate sufficiently strong acoustic signals. This is mainly due to a low energy transfer efficiency from photothermal effect to an acoustic signal. Moreover, as the acoustic wave propagates to all directions, the measured vibration at the detection location site will be even weaker.

From a theoretical point of view, investigations have been done to increase the efficiency of the PA effect. Wenyu Bai and Gerald J. Diebold, "*Photoacoustic effect generated by moving optical sources: Motion in one direction*", Journal of Applied Physics 119, 124904 (2016), doi: 10.1063/1.4944648 disclose that the acoustic wave amplitude may be increased when the motion of the optical source is synchronized to that of the acoustic wave. However, no practical application of this theory is proposed.

SUMMARY

It is an object of the present invention to provide a system for photoacoustic inspection of an object having an improved signal-to-noise ratio (SNR).

This object is achieved according to the invention with a system for photoacoustic inspection of an object, the system comprising: a broadband emission source configured to generate an emission beam; a direction apparatus connected to the broadband emission source, the direction apparatus comprising at least one spectrum splitter configured to split the emission beam into at least a first and a second component, wherein the direction apparatus is configured to sequentially direct the first component to N first locations on the object at N times to generate N first acoustic waves within the object, N being a natural number exceeding one, wherein the N first locations and N times are such that the N first acoustic waves at least semi-constructively interfere to generate a first propagating acoustic wave within the object, wherein the direction apparatus is configured to sequentially direct the second component to N second locations on the object at said N times to generate N second acoustic waves within the object, wherein the N second locations and N times are such that the N second acoustic waves at least semi-constructively interfere to generate a second propagating acoustic wave within the object, the first N locations and the second N locations being different from one another; and a vibration sensing system configured to detect the first propagating acoustic wave at a first detection location on the object and to detect the second propagating acoustic wave at a second detection location on the object.

By using a direction apparatus to sequentially direct the emission beam to different locations on the object, multiple acoustic waves are generated within the object. By appropriately choosing the locations and times, the multiple acoustic waves are such that they at least semi-constructively interfere to generate a propagating acoustic wave having an amplitude that is greater than any one of the individual acoustic waves. Consequently, the resulting propagating acoustic wave has an enhanced signal strength such that it is easier to detect by the vibration sensing system than any of the individual acoustic waves, thereby improving the SNR when compared to a system where only a single acoustic wave is generated.

The use of a broadband source and at least one spectrum splitter allows for generation of multiple (i.e. the first and the second) propagating acoustic waves within the object for different wavelengths. This improves the speed at which a PA spectrum may be generated for the object when compared to an emission source emitting a single wavelength.

In an embodiment of the present invention, the direction apparatus comprises a plurality of spectrum splitters, each of the spectrum splitters corresponding to one of the plurality of locations.

Providing a spectrum splitter at each location avoids having to provide one or more moving spectrum splitters to cover all locations. It will be readily appreciated that such moving spectrum splitters would make the system more complicated both during set-up and during operation as the movement of the spectrum splitters would have to be coordinated with the locations and times at which the emission beam needs to impact the object.

In an embodiment of the present invention, the broadband source comprises a plurality of broadband sources, each broadband source corresponding to a spectrum splitter, and the direction apparatus comprises a switching array configured to sequentially activate at least one of the plurality of broadband sources.

Such a system has the advantage that no moving broadband source is required, which, as described above, leads to a less complicated system.

In an embodiment of the present invention, the direction apparatus comprises routing means configured to sequentially direct the emission beam from the broadband source to one of the plurality of spectrum splitters.

Such a system has the advantage that no moving broadband source is required, which, as described above, leads to a less complicated system.

Moreover, both embodiments provide flexibility in designing the system. While a switching array reduces the total number of moving parts, the routing means allow for using a single broadband source.

In an embodiment of the present invention, the vibration sensing system comprises a vibration sensor, such as an accelerometer or a contactless vibration sensor, such as an on-chip interferometer with at least one membrane, or a laser Doppler vibrometer.

A contactless vibration sensor avoids having to place the vibration sensor in direct contact with the object. A laser Doppler vibrometer (LDV) has a much broader bandwidth when compared to an accelerometer. Moreover, the LDV is also very sensitive which aids in detecting the propagating acoustic wave.

In an embodiment of the present invention, the vibration sensing system comprises a multi-beam laser Doppler vibrometer configured to detect each of the different propagating waves, the multi-beam laser Doppler vibrometer being realized with a photonic integrated circuit.

Using a multi-beam LDV is a way to measure the different propagating waves in the case of a broadband source while only requiring a single detection device. Moreover, such an LDV may be realized with a photonic integrated circuit (PIC) as disclosed in Yanlu Li et al., "*Six-beam homodyne laser Doppler vibromeny based on silicon photonics technology*", 2 Feb. 2018, Optical Society of America, OPTICS EXPRESS, Vol. 26, No. 3.

In an embodiment of the present invention, the plurality of first/second locations are substantially aligned along a signal direction and are separated by a distance based on the sound speed within the object, the first/second detection location being located further along said signal direction when viewed from a last one of said plurality of first/second locations.

In this embodiment, the system set-up is simplified by using a straight line along which the propagating acoustic wave is generated. Moreover, using the sound speed within the object as a basis for the locations improves the constructive interference effect of the multiple individual acoustic waves.

In an embodiment of the present invention, the system further comprises a mechanical cavity and/or membrane placed close to each detection location, the mechanical cavity having a mechanical resonance frequency that is similar to the acoustic frequency of the respective propagating acoustic wave within the object to be detected at the detection location.

This embodiment further enhances the signal amplitude by using a mechanical cavity and/or membrane. By having a mechanical resonance frequency that is similar to the acoustic frequency of the propagating acoustic wave, the measured vibration can be further enhanced.

It is an object of the present invention to provide a method for photoacoustic inspection, in particular photoacoustic inspection of an object having an improved signal-to-noise ratio (SNR).

This object is achieved by a method for photoacoustic inspection of an object, the method comprising the steps of: a) generating a broadband emission beam; b) splitting the broadband emission beam into at least two components; c) directing, at an initial time, each component of the emission beam towards an initial location on the object to generate an initial acoustic wave within the object; d) directing, at a predefined time interval after the initial time, each component of the emission beam towards a further location on the object to generate a further acoustic wave within the object, which further location is based on the sound speed within the object such that the initial and the further acoustic wave at least semi-constructively interfere to generate a propagating acoustic wave for each component within the object; and e) detecting each propagating acoustic wave at a detection location.

By sequentially directing the emission beam to different locations on the object, multiple acoustic waves are generated within the object. By appropriately choosing the locations and times (i.e. based on the sound speed within the object), the multiple acoustic waves are such that they at least semi-constructively interfere to generate a propagating acoustic wave having an amplitude that is greater than any one of the individual acoustic waves. Consequently, the resulting propagating acoustic wave has an enhanced signal strength such that it is easier to detect than any of the individual acoustic waves, thereby improving the SNR when compared to a method where only a single acoustic wave is generated. Moreover, splitting the broadband emission beam into at least two components allows for generating multiple propagating acoustic waves within the object for different wavelengths. This improves the speed at which a PA spectrum may be generated for the object when compared to an emission source emitting a single wavelength.

In an embodiment of the present invention, step d) is repeated for a plurality of further locations, each being separated by a distance based on the sound speed within the object.

By increasing the amount of locations, the number of individual acoustic waves is increased which, in turn, also increases the amplitude of the resulting propagating acoustic wave as each wave contributes to its generation.

In an embodiment of the present invention, steps a) to d) comprise using a switching array to periodically activate at least one emission source from a plurality of emission sources.

BRIEF DESCRIPTION OF THE FIGURES

The invention will be further explained by means of the following description and the appended figures.

DETAILED DESCRIPTION

Figure 1:
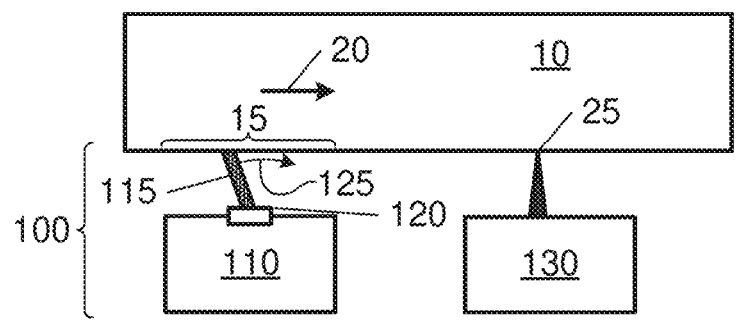
FIG. 1 shows a system for photoacoustic inspection of an object.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The present invention generally relates to photoacoustic inspection of an object and may be used for various purposes. Examples include measuring food compounds (e.g. to detect trace quantities of pollution or other unwanted substances), oil compound evaluation, non-contact glucose sensing in biological tissue, gas compound evaluation, etc. It will thus be readily appreciated that the term "object" should be interpreted broadly and may include solid, liquid, gaseous, plasma and other states of matter.

Photoacoustic inspection is based on the photoacoustic (PA) effect, which is the formation of acoustic waves following light absorption in a material sample, i.e. the object.

The main idea of the present invention is to introduce a sonic boom in the object by using a photo-acoustic sound source that moves along the object. In other words, a plurality of individual acoustic waves are induced in the object due to the PA effect. These individual acoustic waves interfere with one another and generate a propagating acoustic wave (i.e. a sonic boom). This wave may then be detected by a vibration sensing system at a detection location on the object.

As used herein, the term "semi-constructive interference" means that the acoustic amplitude of the propagating acoustic wave is higher than the acoustic amplitude from any single acoustic source alone. The amplitude comparison is made at the detection location. Mathematically this may be represented as $|A\_res|>|A\_k|$ for $k=1, \ldots, N$ where $A\_res$ is the amplitude of the propagating acoustic wave at the detection location, $A\_k$ is the amplitude of individual acoustic wave k at the detection location and N is the total number of individual acoustic waves.

FIG. 1 shows a system 100 for photoacoustic inspection of an object 10. The system 100 comprises a scanning source 110 that emits an optical beam 115. A direction apparatus 120 is integrated within the scanning source 110 and allows the optical beam 115 to be rotated as indicated by arrow 125, i.e. the direction apparatus 120 comprises routing means (not shown) that rotate the optical beam 115. This rotation enables to move the optical beam 115 in a continuous fashion across a surface area 15 (i.e. a straight line) of the object 10. Due to the PA effect, the optical beam 115 causes the generation of multiple individual acoustic waves within the object that interfere to generate a propagating acoustic wave as indicated by arrow 20. The system 100 further includes a vibration sensing system that detects the propagating acoustic wave within the object at at least one detection location 25.

The interference of the individual acoustic waves is optimized in case the movement speed of the optical beam 115 across the surface 15 is similar to that of the sound speed within the object. Although it will be readily appreciated that the system 100 also achieves an improved SNR at the detection location 25 when the interference of the individual acoustic waves is sub-optimal, i.e. when there is only semi-constructive interference.

In the illustrated embodiment, the direction apparatus 120 rotates the optical beam 115 along a straight line 15 on the surface of the object 10. This causes the propagating wave 20 to also propagate along this same direction, also called the signal direction. It is thus advantageous to place the detection location further along this signal direction to detect the peak amplitude of the propagating wave 20.

Figure 2:
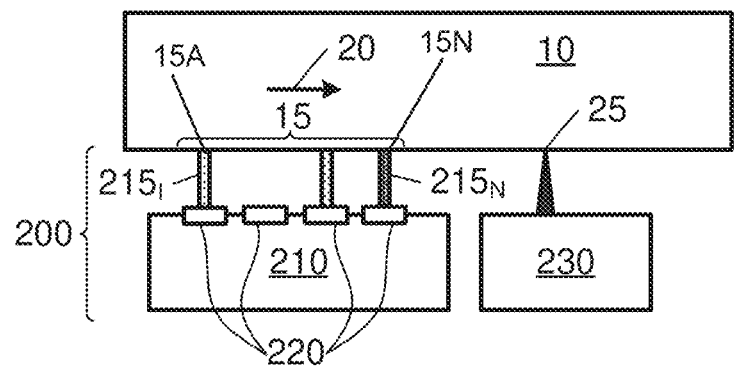
FIG. 2 shows a system for photoacoustic inspection of an object.

FIG. 2 shows a system 200 for photoacoustic inspection of an object 10. The system 200 comprises a switching source array 210 that emits a plurality of optical beams $215_1, \ldots, 215_N$ where N is a natural number greater than one that denotes the total number of optical beams 215 that may be output from the switching source array 210. A direction apparatus 220 is integrated within the switching source array 210 and controls which optical beams $215_1, \ldots, 215_N$ are output at a certain moment in time. Each output from the switching source array 210 has a corresponding impact location $15_1, \ldots, 15_N$ on the object 10. The direction apparatus 220 is able to control the positions and times at which the optical beams $215_1, \ldots, 215_N$ impact the target location 15 on the object 10. Due to the PA effect, the optical beams $215_1, \ldots, 215_N$ cause the generation of multiple individual acoustic waves within the object that interfere to generate a propagating acoustic wave as indicated by arrow 20. The system 200 further includes a vibration sensing system 230 that detects the propagating acoustic wave within the object at at least one detection location 25.

The use of a switching source array 210 allows for varying the configuration of the impact locations $15_1, \ldots, 15_N$. One configuration is where the impact locations are aligned with one another with a distance based on the sound speed within the object 10 and the switching source array 210 outputs subsequent optical beams $215_1, \ldots, 215_N$ with a timing to cause the impact location of the next beam to move along the signal direction with a speed similar to that of the sound speed within the object 10. It will be readily appreciated that the system 200 also achieves an improved SNR at the detection location 25 when the interference of the individual acoustic waves is sub-optimal, i.e. when there is only semi-constructive interference, which may be obtained by a variety of configurations conceivable.

The emission source in the system 100 and the system 200 is typically a laser that emits a single-wavelength beam. Preferably a tuneable laser is used which allows multiple absorption lines of the object to be tested.

Figure 3A:
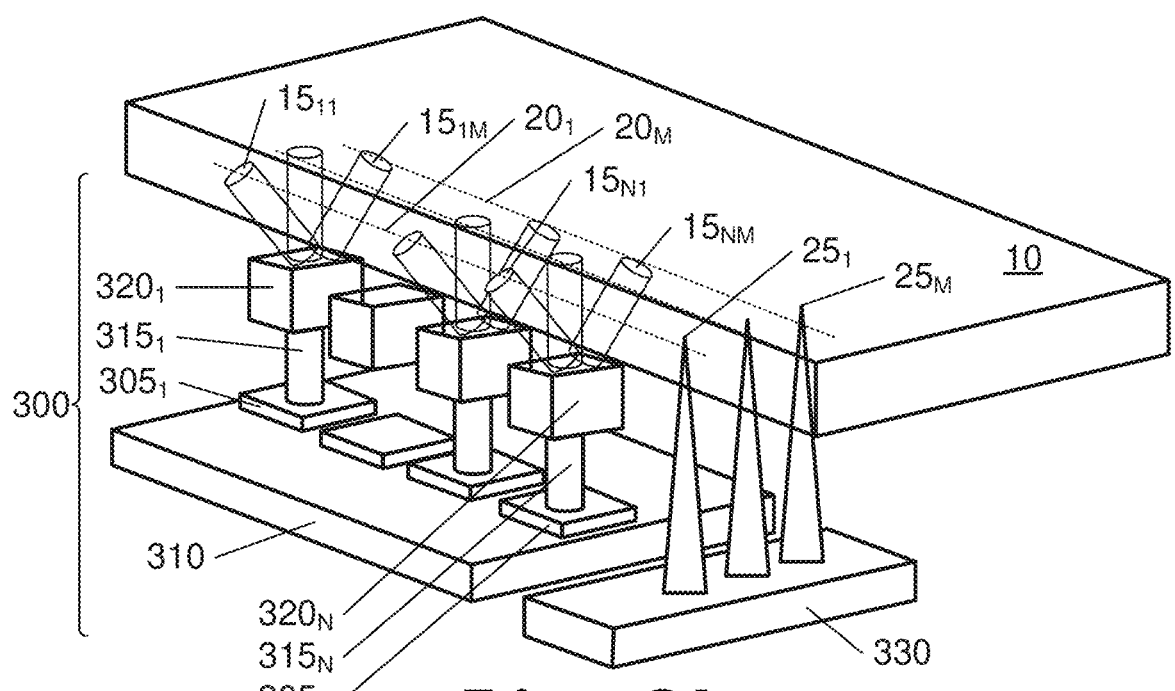
FIG. 3A shows a system for photoacoustic inspection of an object.
Figure 3B:
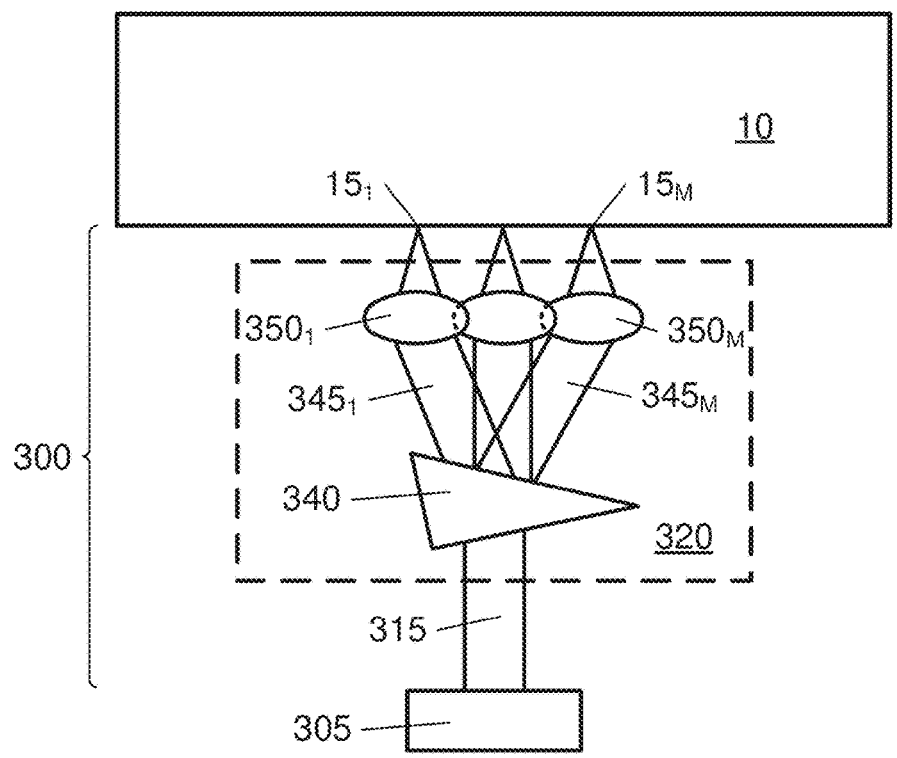
FIG. 3B shows a system for photoacoustic inspection of an object.

FIG. 3A and FIG. 3B show an embodiment of a system 300 for photoacoustic inspection of an object 10. The system 300 comprises a plurality of broadband optical sources $305_1, \ldots, 305_N$, where N is a natural number greater than one that denotes the total number of broadband sources. Each broadband source $305_1, \ldots, 305_N$ emits an optical beam $315_1, \ldots, 315_N$ towards a plurality of spectrum splitters 340 that form part of a direction apparatus 320. Each spectrum splitter 340 splits the broadband emission 315 into multiple components $345_1, \ldots, 345_M$ where M is a natural number greater than one that denotes the total number of components (M is equal to three in the illustrated embodiment). The direction apparatus 320 further includes optical focusing means $350_1, \ldots, 350_M$ for each component that focus the component onto a single target location $15_{11}, \ldots, 15_{NM}$ on the object 10. In the illustrated embodiment, the broadband sources $305_1, \ldots, 305_N$ are integrated into an optical switching array 310 similar to the embodiment of FIG. 2. The direction apparatus 320 further includes means to control this switching array 310 in order to control the activation of the various sources $305_1, \ldots, 305_N$. The direction apparatus 320 is able to control the positions and times at which the optical beam components $345_1, \ldots, 345_M$ impact the target locations $15_{11}, \ldots, 15_{NM}$ on the object 10. Due to the PA effect, the optical beam components $345_1, \ldots, 345_M$ cause the generation of multiple individual acoustic waves within the object that interfere to generate M propagating acoustic waves as indicated by dotted lines $20_1, \ldots 20_M$ in FIG. 3A. The system 300 further includes a vibration sensing system 330 that detects the propagating acoustic waves within the object at at least M detection locations $25_1, \ldots 25_M$.

The use of a switching source array 310 allows for varying the configuration of the impact locations $15_{11}, \ldots, 15_{NM}$. One configuration is where the impact locations of the different optical beam components $345_1, \ldots, 345_M$ are aligned with one another with a distance based on the sound speed within the object 10 and the switching source array 310 outputs subsequent optical beams $315_1, \ldots, 315_N$ with a timing to cause the impact location of the next beam to move along the signal direction with a speed similar to that of the sound speed within the object 10. It will be readily appreciated that the system 300 also achieves an improved SNR at the detection locations $25_1, \ldots 25_M$ when the interference of the individual acoustic waves is sub-optimal, i.e. when there is only semi-constructive interference, which may be obtained by a variety of configurations conceivable.

The vibration sensing system 130, the vibration sensing system 230, and the vibration sensing system 330 of the systems described above typically comprise a vibration sensor to detect the propagating acoustic wave(s) 20, such as an accelerometer. A contactless vibration sensor avoids having to place the vibration sensor in direct contact with the object 10. A laser Doppler vibrometer (LDV) is advantageous as it has a much broader bandwidth when compared to an accelerometer. Moreover, the LDV is also very sensitive which aids in detecting the propagating acoustic wave. In the system of FIG. 3A and FIG. 3B, a multi-beam LDV (e.g. realized by a photonic integrated circuit PIC as disclosed in Yanlu Li et al., "*Six-beam homodyne laser Doppler vibrometry based on silicon photonics technology*", 2 Feb. 2018, Optical Society of America, OPTICS EXPRESS, Vol. 26, No. 3) allows simultaneous measurement of the different propagating acoustic waves $20_1, \ldots, 20_M$ using a single device. It will be readily appreciated that each propagating acoustic wave 20 may also be detected by multiple vibration sensors simultaneously, for example multiple LDVs that each detect a different component of displacement of the same propagating acoustic wave.

The system 100, the system 200, and the system 300 may be further enhanced by providing a mechanical cavity and/or membrane placed close to the detection location(s) 25 as this enhances the signal amplitude of the propagating acoustic wave(s) 20. Preferably, the mechanical cavity has a mechanical resonance frequency that is similar to the acoustic frequency of the propagating acoustic wave within the object as this further enhances the vibration amplitude. In practice, this may be achieved by having a mechanical cavity resonance frequency within the 6 dB band of the frequency of the propagating acoustic wave within the object 10.

It will be readily appreciated that the system 100, the system 200, and the system 300 described above may be used for photoacoustic inspection, such as photoacoustic application or photoacoustic spectroscopy.

Figure 4:
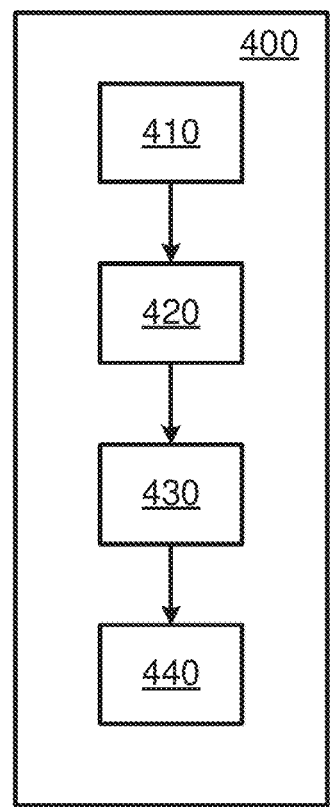
FIG. 4 illustrates a method for photoacoustic inspection of an object.

FIG. 4 illustrates a method 400 for photoacoustic inspection of an object 10, by using the system 100, the system 200, or the system 300 described above.

The method starts by generating 410 the optical beam 115, the optical beam 215, or the optical beam 315. At an initial time to, the optical beam 115, the optical beam 215, or the optical beam 315 is directed 420 towards an initial location 15 on the object 10 to generate an initial acoustic wave within the object 10. In the systems of FIG. 2 and FIG. 3, the initial position may be the first position $15_1$, i.e. the position farthest away from the detection location 25. Subsequently, the optical beam 115, the optical beam 215, or the optical beam 315 are directed 430 towards further location on the object 10. In the system of FIG. 1, the initial and further locations form a continuous line, while in the systems of FIG. 2 and FIG. 3 these positions are distinct from one another and are separated by a certain distance. The times and positions (i.e. the movement speed of the impact locations along the object 10) is such that the initial and the further acoustic wave(s) at least semi-constructively interfere to generate a propagating acoustic wave 20 within the object 10. Finally, the generated acoustic wave 20 is detected 440 at the detection location 25. Steps 410, 420 and 430 may be jointly performed by the switching array 210 or the switching array 310 as described above by reference to FIG. 2 and FIG. 3.

By sequentially directing the emission beam to different locations on the object, multiple acoustic waves are generated within the object. By appropriately choosing the locations and times (i.e. based on the sound speed within the object), the multiple acoustic waves are such that they at least semi-constructively interfere to generate a propagating acoustic wave having an amplitude that is greater than any one of the individual acoustic waves. Consequently, the resulting propagating acoustic wave has an enhanced signal strength such that it is easier to detect than any of the individual acoustic waves, thereby improving the SNR when compared to a method where only a single acoustic wave is generated.

FIGS. 5A to 5G will be used to illustrate simulation results when using the system 200 shown in FIG. 2 with a varying number of individual acoustic waves N.

The following assumptions and notations will be used. We assume that the input optical power at an impact location is $P_{in}$ and the power generated to the acoustic energy is $P_a = kP_{in}$, where k is the energy transfer ratio. We assume k to be the same for all cases. The generated sound wave power is $$P_a = \frac{Ap^2}{\rho c},$$

where A is the area of the surface, p is the sound pressure, $\rho$ is the mass density and c is the speed of sound. If we split the input optical power into N impact locations (also termed spots), the sound power for each spot is $P_{ae} = P_a/N$ and the corresponding sound pressure will be $$p = \sqrt{\frac{P_a \rho c}{AN}} = \sqrt{P_{in}\rho c} \cdot \sqrt{\frac{k}{AN}}.$$

The volume of each spot is assumed to be the same. The radius of the spot is denoted as $r_s$. This radius is determined by the size of the light spot, the absorption depth, and the scattering size of the light. The area at the boundary of the spot is $A_s = 4\pi r_s^2$. The pressure at $r_s$ will be $$p(r_s) = \sqrt{\frac{P_{in}\rho c}{4\pi}} \cdot \frac{1}{r_s}\sqrt{\frac{k}{N}}.$$

When the sound pressure propagates to a region with a radius r, the sound pressure will be $$p(r) = p \cdot \frac{r_s}{r}.$$

Therefore the sound pressure decreases inversely proportional to the radius. The wavelength of the sound wave is $$\lambda = \frac{c}{f},$$

where f is the sound frequency. The vector of the sound pressure at the radius $r_s$ and at time t can be expressed as:

$$p(r, t) = \sqrt{\frac{P_{in}\rho c}{4\pi}} \cdot \frac{1}{r}\sqrt{\frac{k}{N}} \cdot \exp[-i \cdot 2\pi \cdot (\frac{r}{\lambda} - ft)]$$

The sound propagating on the surface is a transverse wave with a vibration direction in the normal direction of the surface. If we have several sound sources, the sound pressure can be summed to obtain the final pressure.

$$p_{total} = \Sigma p_n(r, t)$$

We also assume the sound pressure wave is not changed by another sound source when it propagates through the various impact locations. This is valid when the photo-acoustic source is not strong. N spots are used to enhance the sound pressure of the propagating acoustic wave with the spots being in a line with a uniform spacing d. To create the optimal interference, the generation of the optical signals 15 have a controlled time delay to ensure that it is compatible to the traveling time of the sound pressure between the two adjacent spots. For example, if $d=\lambda/\alpha$, then the time delay $\Delta t$ of the two generation beams is $$\Delta t = \frac{\lambda}{\alpha c}.$$

The sound pressure of all spots thus have constructive interference at one direction. The following values are used in the simulation:

$$r_s = 0.1 \text{ mm}, \lambda = 1 \text{ mm}, \sqrt{\frac{P_{in}\rho c}{4\pi}} r_s = 1,$$

and f=1 MHz, such that $c=\lambda f=1$ km/s.

Figure 5A:
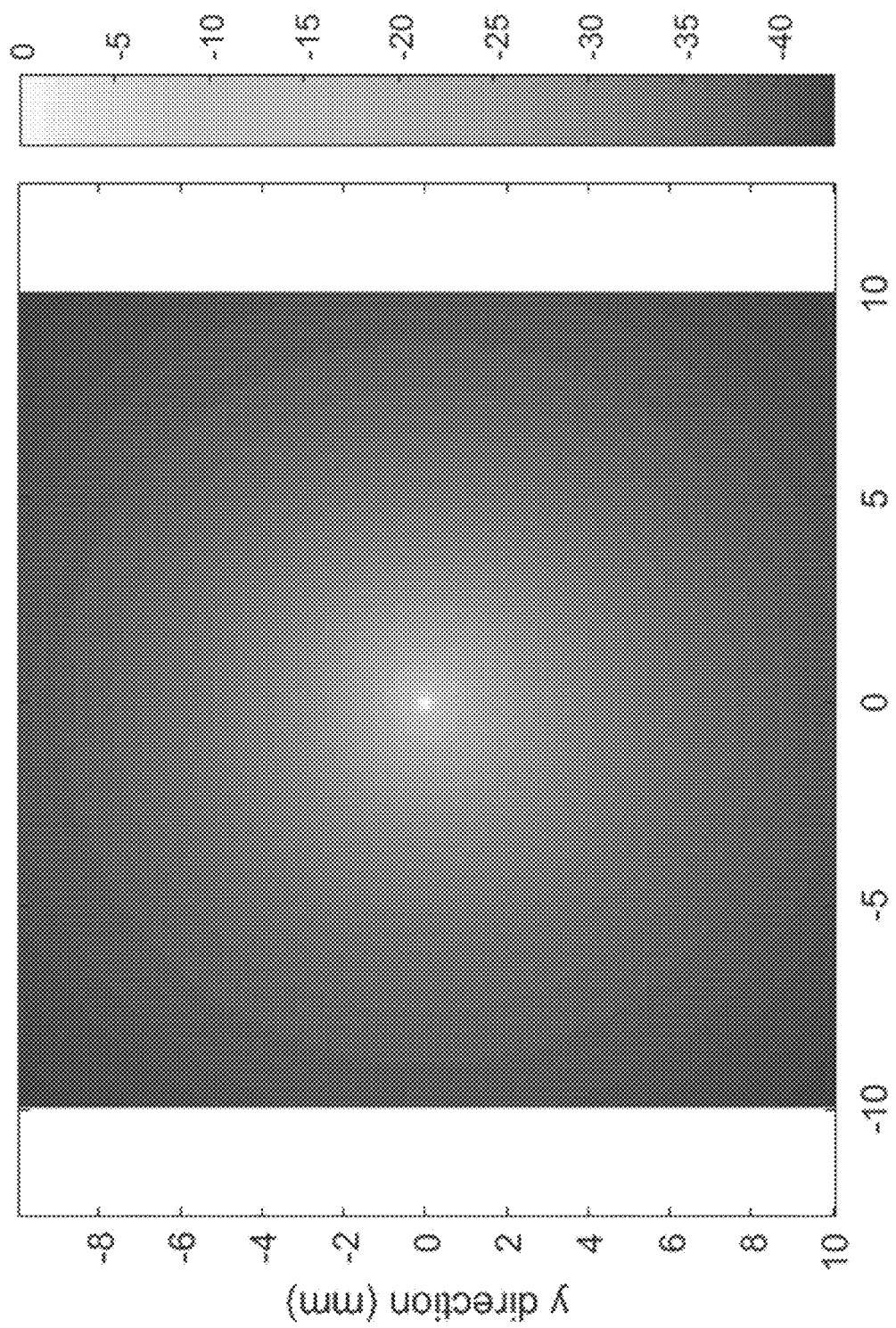
FIG. 5A shows simulation results from a system.
Figure 5B:
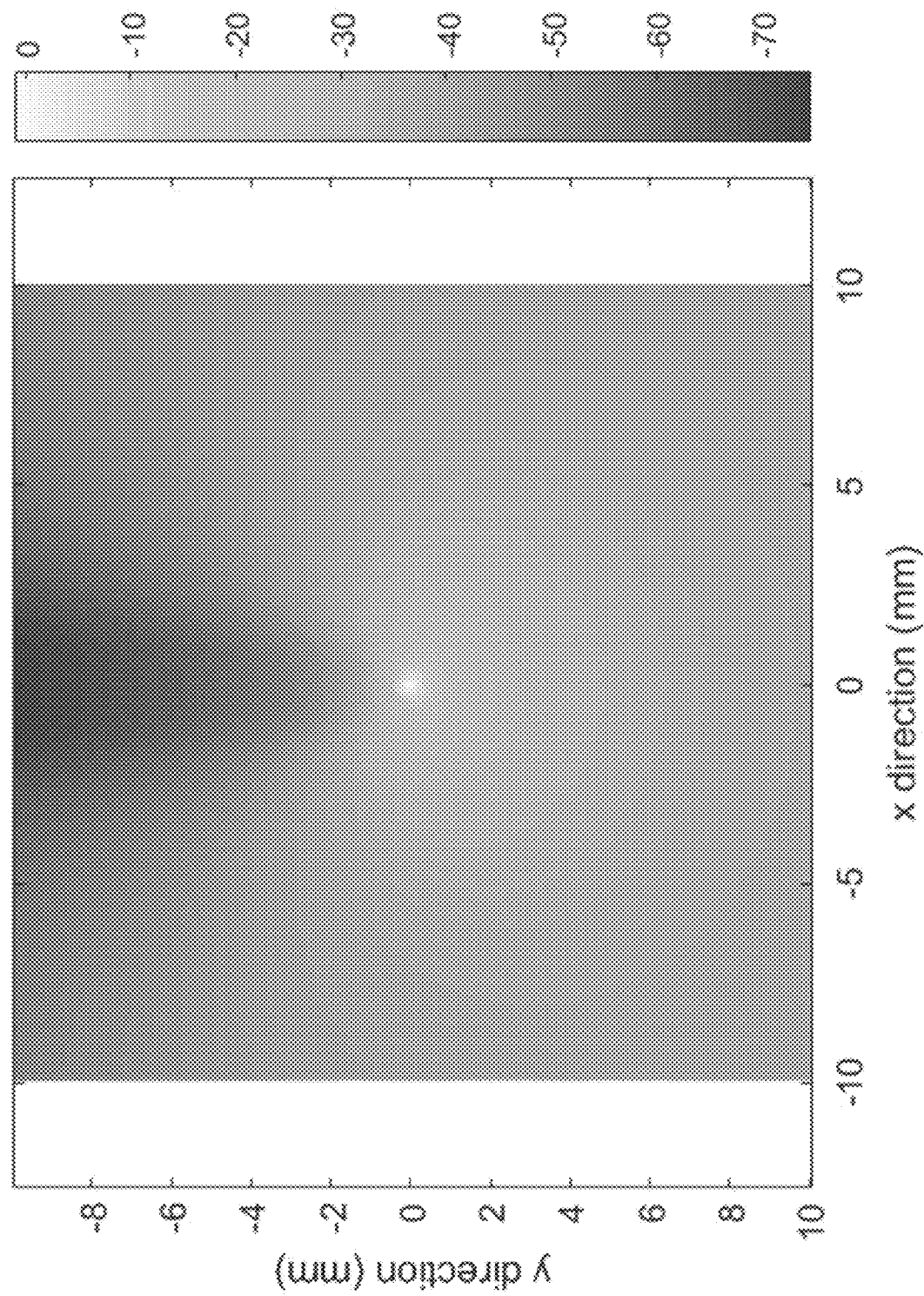
FIG. 5B shows simulation results from a system.
Figure 5C:
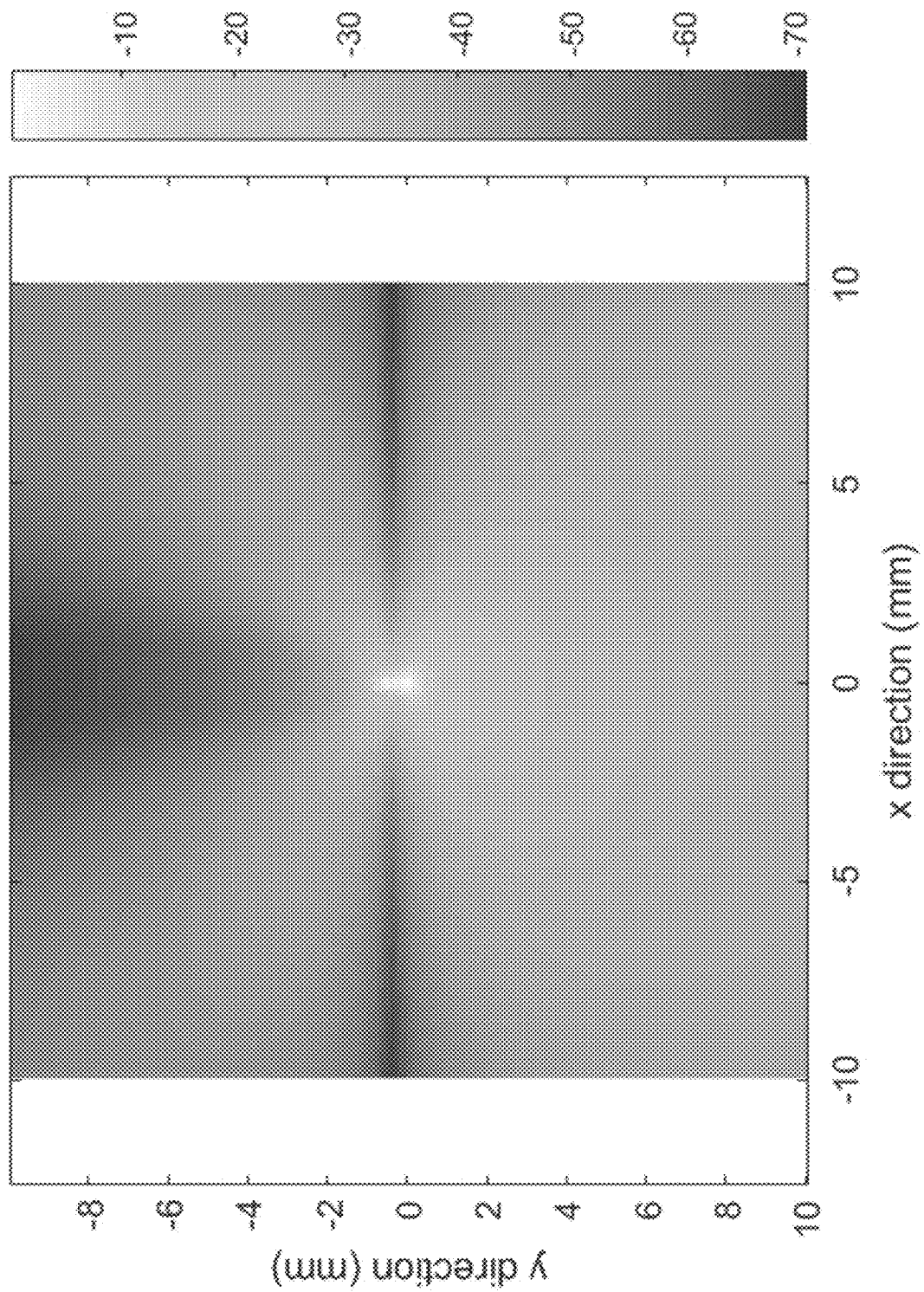
FIG. 5C shows simulation results from a system.
Figure 5D:
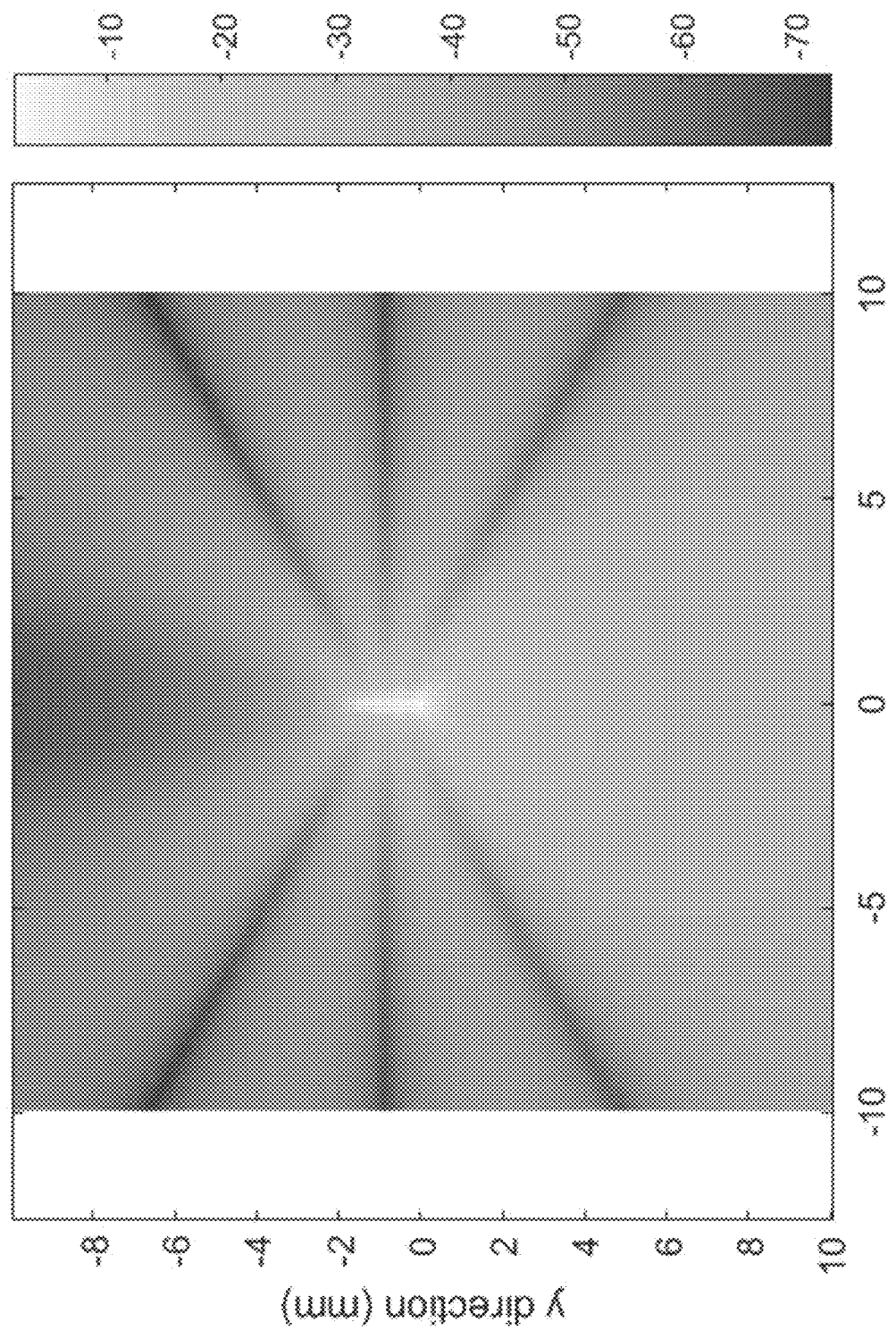
FIG. 5D shows simulation results from a system.
Figure 5E:
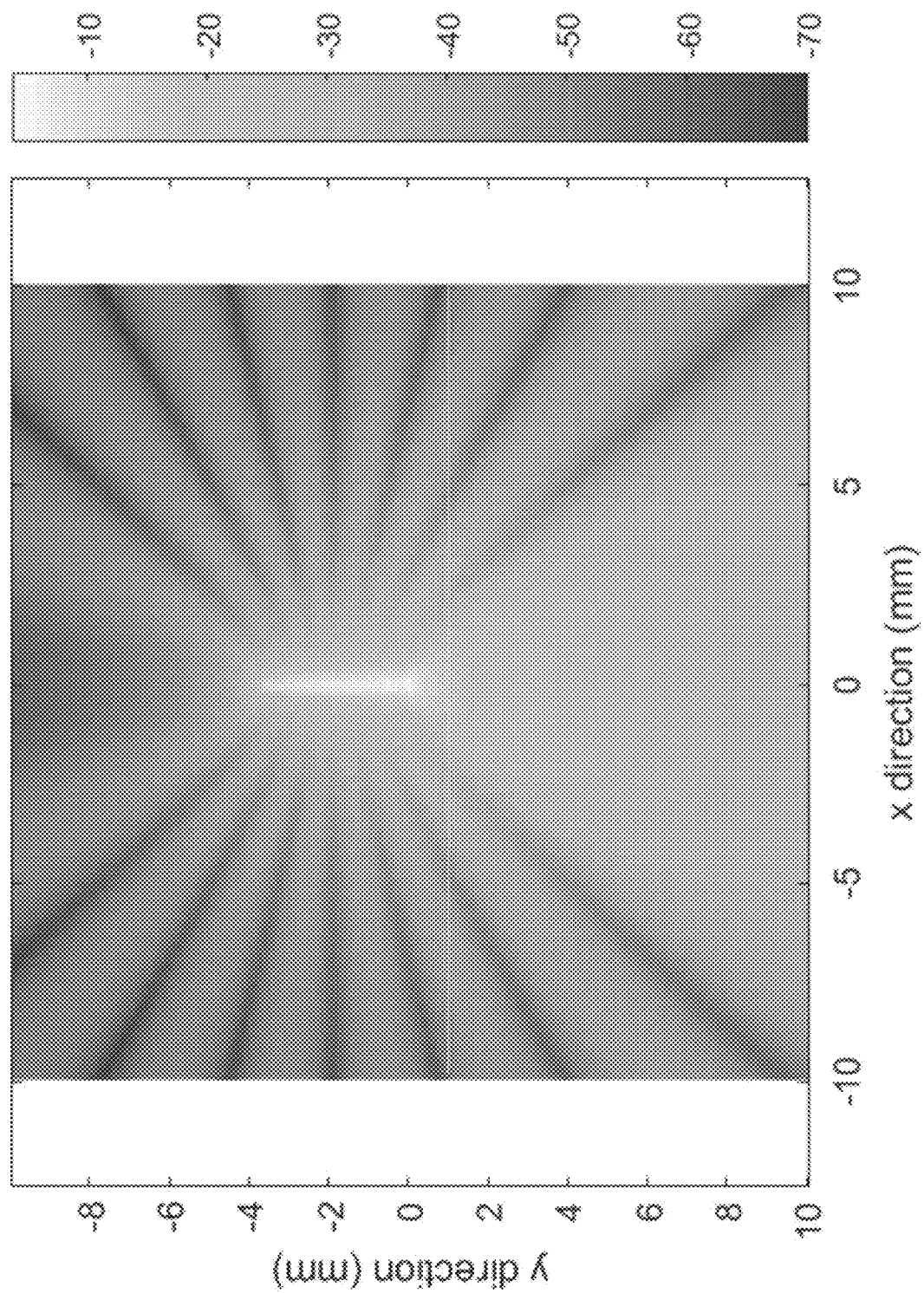
FIG. 5E shows simulation results from a system.

FIG. 5A shows the maximal sound pressure level (in dB=20*log(P)) for different locations on the object when there is only a single spot, i.e. N=1. FIG. 5B shows the same plot for two spots (i.e. N=2) with a separation distance $d=\lambda/4$. FIG. 5B shows that the sound pressure level at positive y direction is much stronger, while is much weaker at the negative y direction. FIGS. 5C, 5D, and 5E show results for 4 spots, 8 spots, and 16 spots respectively. It is clear that the sound pressure power is focused into one direction by increasing the number of spots.

Figure 5F:
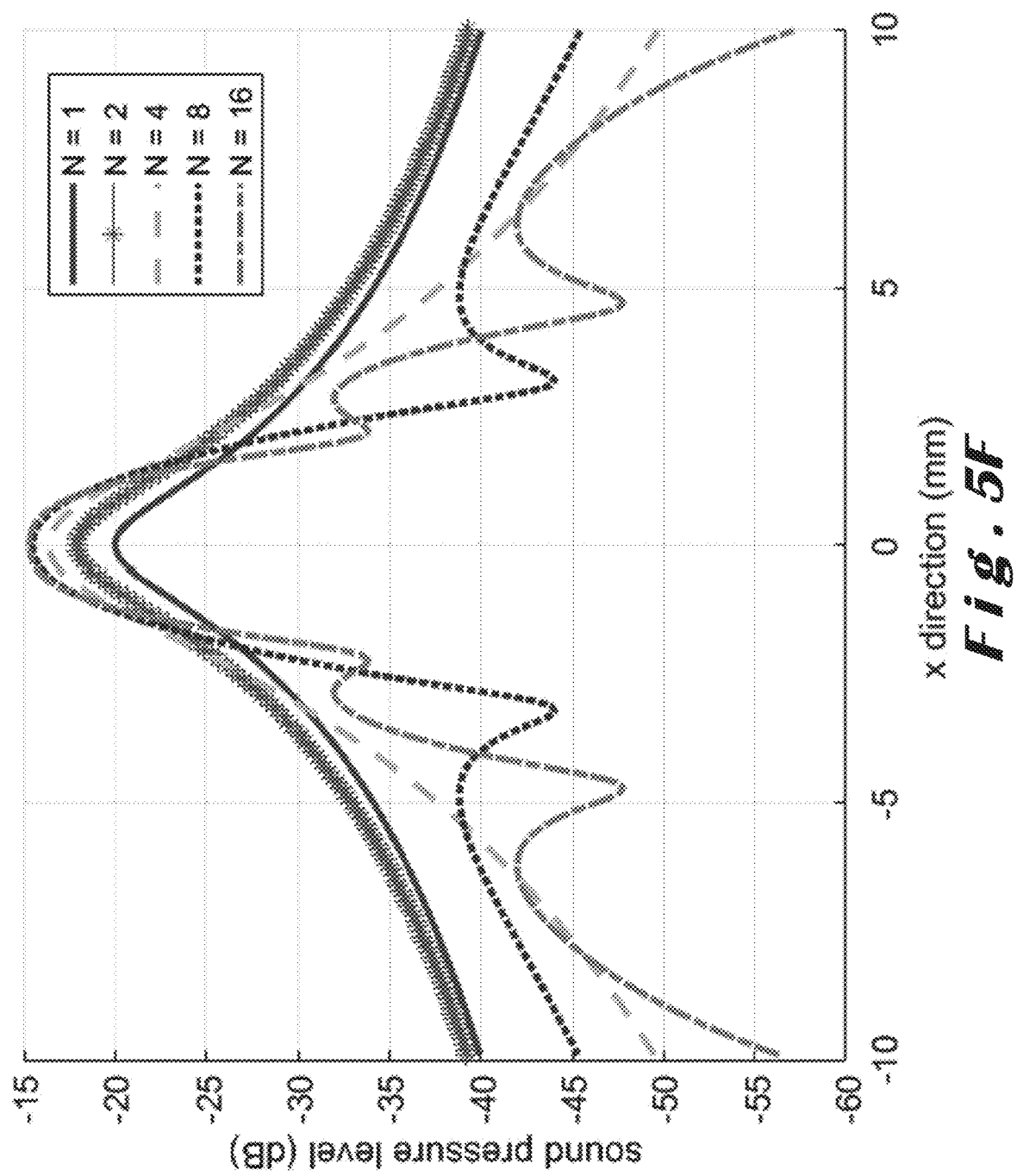
FIG. 5F shows simulation results from a system.
Figure 5G:
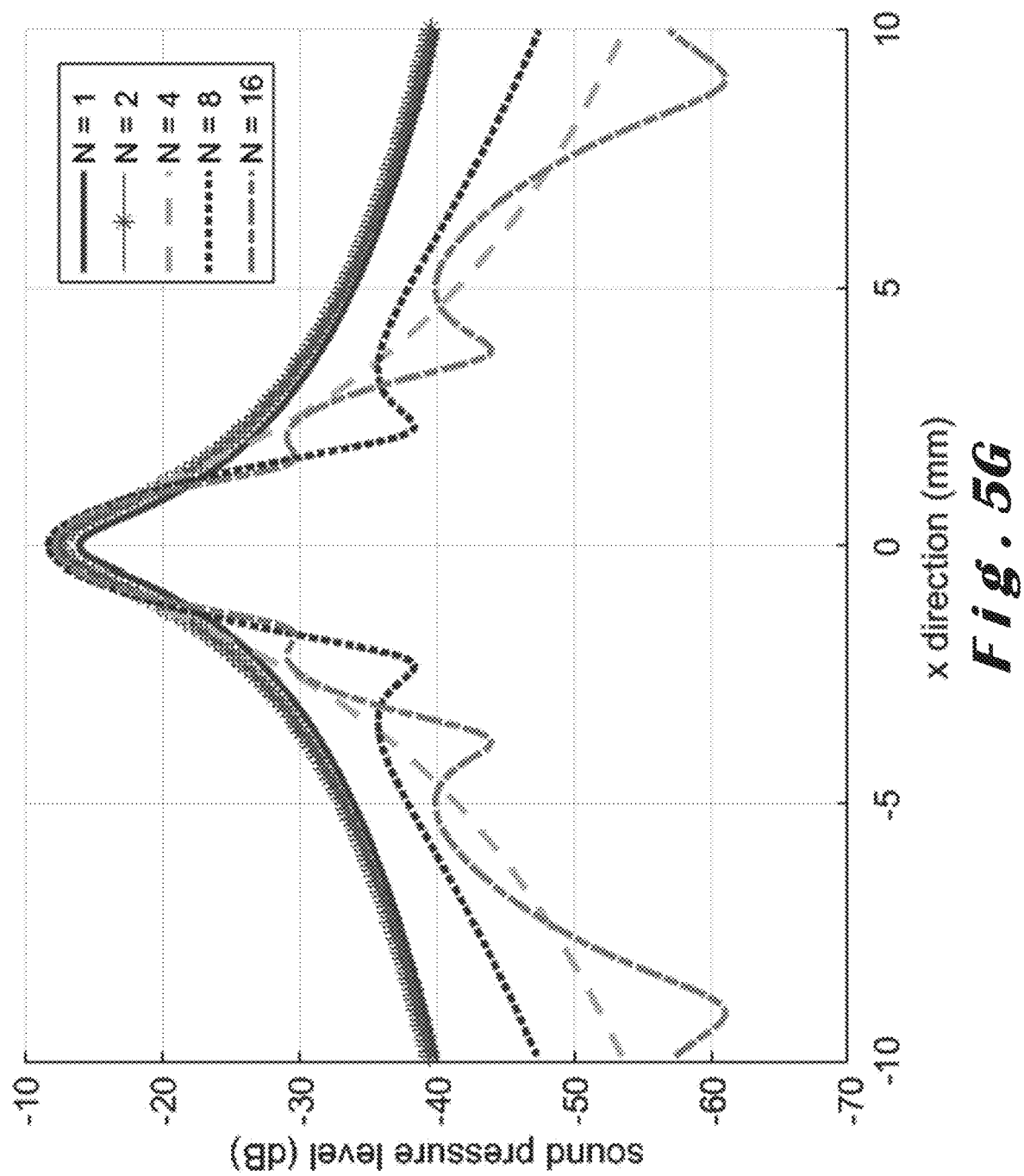
FIG. 5G shows simulation results from a system.

FIG. 5E also shows a line at y=1 mm. FIG. 5F shows the sound pressure along this line for different values of N. FIG. 5F shows that by spreading the sound source into more spots, there is a constructive enhancement of the sound pressure in one direction, i.e. the sound is focused more locally in the space domain. It can be seen in FIG. 5F that at 5 mm away from the center in the x direction, the sound pressure dropped by around 15 dB for N=1, while for N=16, the sound pressure level dropped by 30 dB. Therefore, if we put several lines (i.e. several parallel switching arrays 210) with a spacing of 5 mm, the cross-talks of different lines will be −30 dB. FIG. 5G shows a view similar to FIG. 5F but at y=0.5 mm. A comparison illustrates that the size of the propagating acoustic wave shrinks when the distance of the vibration measurement location to the pressure source is reduced.

Although aspects of the present disclosure have been described with respect to specific embodiments, it will be readily appreciated that these aspects may be implemented in other forms within the scope of the invention as defined by the claims.

The invention claimed is:

1. A system comprising:
   a broadband emission source configured to generate an emission beam;
   a direction apparatus connected to the broadband emission source, the direction apparatus comprising at least one spectrum splitter configured to split the emission beam into a first component and a second component, wherein the first component and the second component have different wavelengths, wherein the direction apparatus is configured to sequentially direct the first component to first locations on an object to generate first acoustic waves within the object such that the first acoustic waves at least semi-constructively interfere to generate a first propagating acoustic wave within the object, wherein the direction apparatus is configured to sequentially direct the second component to second locations on the object to generate second acoustic waves within the object such that the second acoustic waves at least semi-constructively interfere to generate a second propagating acoustic wave within the object, the first locations and the second locations being different from one another; and a vibration sensing system configured to detect the first propagating acoustic wave at a first detection location on the object and to detect the second propagating acoustic wave at a second detection location on the object.

2. The system according to claim 1, wherein the at least one spectrum splitter comprises spectrum splitters that correspond respectively to the first locations and correspond respectively to the second locations.

3. The system according to claim 2, comprising broadband emission sources corresponding respectively to the spectrum splitters, and wherein the direction apparatus comprises a switching array configured to sequentially activate the broadband emission sources.

4. The system according to claim 3, wherein the direction apparatus comprises routing means configured to sequentially direct emission beams from the broadband emission sources respectively to the spectrum splitters.

5. The system according to claim 1, wherein the vibration sensing system comprises a vibration sensor.

6. The system according to claim 5, wherein the vibration sensing system comprises a multi-beam laser Doppler vibrometer configured to detect the first propagating acoustic wave and the second propagating acoustic wave.

7. The system of claim 6, wherein the multi-beam laser Doppler vibrometer is realized with a photonic integrated circuit.

8. The system according to claim 1, wherein the first locations are substantially aligned along a signal direction and the second locations are substantially aligned along the signal direction, the first detection location being located further along said signal direction compared to the first locations and the second detection location being located further along said signal direction compared to the second locations.

9. The system according to claim 1, further comprising a mechanical cavity or membrane placed adjacent to the first detection location or the second detection location.

10. The system according to claim 1, wherein the at least one spectrum splitter is configured to split the emission beam into at least two components.

11. The system of claim 1, wherein the vibration sensing system comprises an accelerometer.

12. The system of claim 1, wherein the vibration sensing system comprises a contactless vibration sensor.

13. The system of claim 1, wherein the vibration sensing system comprises an on-chip interferometer, with at least one membrane.

14. The system of claim 13, wherein the on-chip interferometer comprises at least one membrane.

15. The system of claim 1, wherein the vibration sensing system comprises a laser Doppler vibrometer.

16. A Method comprising:
a) generating a broadband emission beam;
b) splitting the broadband emission beam into a first component and a second component, wherein the first component and the second component have different wavelengths;
c) directing, the first component towards a first initial location on an object and the second component towards a second initial location on the object to generate a first initial acoustic wave within the object and a second initial acoustic wave within the object;
d) directing, the first component towards a first further location on the object and the second component towards a second further location on the object to generate a first further acoustic wave within the object and a second further acoustic wave within the object such that the first initial acoustic wave and the first further acoustic wave at least semi-constructively interfere to generate a first propagating acoustic wave within the object and the second initial acoustic wave and the second further acoustic wave at least semi-constructively interfere to generate a second propagating acoustic wave within the object; and
e) detecting the first propagating acoustic wave and the second propagating acoustic wave.

17. The Method according to claim 16, comprising using a switching array to periodically activate at least one broadband emission source of a plurality of broadband emission sources.

18. The method of claim 16, wherein steps a)-d) are performed as a photoacoustic inspection process.

19. The method of claim 16, wherein steps a)-d) are performed as a photoacoustic application.

20. The method of claim 16, wherein steps a)-d) are performed as a photoacoustic spectroscopy process.

* * * * *